(12) United States Patent
Perkitny

(10) Patent No.: US 6,644,564 B2
(45) Date of Patent: Nov. 11, 2003

(54) PLANT WATERING DEVICE WITH SPRAYER

(76) Inventor: Jerzy Perkitny, 17810 Lake Rd., Lakewood, OH (US) 44107

(*) Notice: Subject to any disclaimer, the term of this patent is extended or adjusted under 35 U.S.C. 154(b) by 0 days.

(21) Appl. No.: 10/067,002

(22) Filed: Feb. 4, 2002

(65) Prior Publication Data

US 2002/0125341 A1 Sep. 12, 2002

Related U.S. Application Data

(60) Provisional application No. 60/273,709, filed on Mar. 6, 2001.

(51) Int. Cl.[7] ................................................. B05B 9/04
(52) U.S. Cl. ........................................................ 239/332
(58) Field of Search ................................ 239/152–154, 239/302, 308, 289, 332, 443–445, 526; 222/333, 527, 530

(56) References Cited

U.S. PATENT DOCUMENTS

| | | | |
|---|---|---|---|
| 4,621,770 A | 11/1986 | Sayen | |
| 4,810,169 A | * 3/1989 | Kranzle | 417/63 |
| 4,881,687 A | 11/1989 | Ballu | |
| 4,925,105 A | 5/1990 | Lin | |
| 5,469,993 A | 11/1995 | Hauf et al. | |
| 5,931,207 A | 8/1999 | Gianino | |
| 6,145,711 A | 11/2000 | Prosper et al. | |

* cited by examiner

Primary Examiner—Lisa A. Douglas
(74) Attorney, Agent, or Firm—Fay, Sharpe, Fagan, Minnich & McKee, LLP

(57) ABSTRACT

A self-contained portable plant watering/misting apparatus includes a housing having a liquid reservoir a filling opening communicating with the reservoir and a pouring spout communicating with the reservoir. A sprayer is selectively supported by the housing. A pump is supported by the housing and communicates with the reservoir. A flexible fluid conduit is connected at a first end with the pump and a second end with the sprayer. The housing can also include a handle and a recess. The recess accommodates the sprayer when it is held by the housing.

26 Claims, 14 Drawing Sheets

PLANT WATERING DEVICE WITH SPRAYER

This application claims the benefit of provisional application Ser. No. 60/273,709, filed Mar. 6, 2001.

BACKGROUND OF THE INVENTION

The present invention relates to plant watering devices. More specifically, the instant invention pertains to a plant watering device which is provided with a selectively removable spray gun that can be connected to the watering device by flexible coiled tubing.

To properly care for house plants it is necessary to water the potted soil and, perhaps, to spray the plant leaves at periodic intervals to ensure that the plants have an adequate supply of water. Many portable watering devices have been developed in an attempt to meet plant watering needs. Most devices include a reservoir containing liquid to be dispensed onto the plants and a spout through which the liquid can be dispensed. Some devices include a hand held unit through which a liquid held in a reservoir can be dispensed under pressure. The hand held unit usually includes some type of valve so that the flow of liquid to the plants can be regulated. These types of devices include many different means for pressurizing the liquid including hand operated delivery pumps, pumps for pressurizing the reservoir and battery operated delivery pumps. Such devices do not, however, also have a spout.

Another device includes a manually operated mister mounted on a conventional watering can. Water within the can may be dispensed either in a stream by tipping the can allowing the liquid to flow out of the conventional pour spout or as a mist by pumping the manually operated mister. This device is extremely difficult to use with overhead plants because the entire device must be elevated to the height of the plants in order to pour water thereon to. Further, the manually operated misting pump is tedious and impractical to operate except on a limited scale.

Another known portable plant watering device includes a reservoir, a hand held spray gun connected to the reservoir and a spout. In this design, a battery powered pump and motor are used to pressurize the liquid and deliver it to the dispensing device. However, this design does not provide a nesting feature for the dispensing device on the reservoir. Rather, the dispensing device or spray gun does not appear to be attachable to the reservoir.

Accordingly, it has been considered desirable to develop a new and improved watering can with a sprayer which would overcome the foregoing difficulties and others while providing better and more advantageous overall results.

SUMMARY OF THE INVENTION

In accordance with one embodiment, the present invention pertains to a plant watering device which is provided with a nested spray nozzle that can be selectively separated from a watering can in order to allow watering of overhead plants and the like. Consequently, liquid may be dispensed onto the plants either via the conventional spout of the watering can or through the spray nozzle. The watering device of the present invention permits one to both water and spray plants using a single hand held unit which does not require a nozzle adjustment to switch from watering to spraying and vice versa. Moreover, the present invention provides a nested arrangement for the spray nozzle in the watering can to allow ease of use.

According to another aspect of the present invention, a self-contained portable plant watering/misting device is provided.

More particularly, in accordance with this aspect of the invention, a housing includes a liquid reservoir, a filling opening communicating with the reservoir and a pouring spout communicating with the reservoir. A spray gun is selectively supported by the housing. A pump is supported by the housing and communicates with the reservoir. A flexible fluid conduit is connected at a first end with the pump and at a second end with the spray gun.

In accordance with another aspect of the present invention, a self-contained portable liquid dispensing system is provided. More particularly, in accordance with this aspect of the invention, a housing includes a liquid reservoir, a filling opening communicating with the reservoir and a dispensing opening communicating with the reservoir. The dispensing opening is spaced from the filling opening. A sprayer is selectively received in the housing recess. A pump is supported by the housing and communicates with the reservoir. A flexible fluid conduit is connected at a first end with the pump and at a second end with the sprayer.

In accordance with still another aspect of the invention, a portable liquid dispenser is provided.

More particularly, in accordance with this aspect of the invention, a housing includes a liquid reservoir, a filling opening communicating with the reservoir, a pouring spout communicating with the reservoir, and a compartment separated from the reservoir. A spray gun is selectively supported by the housing with the spray gun comprising a trigger operated switch. A pump is mounted in the compartment and communicates with the reservoir. A flexible fluid conduit is connected at a first end with the pump and at a second end with the spray gun. A power source is located in the compartment and is energizingly connected to the switch and to the pump. Activating the trigger operated switch energizes the pump causing liquid to flow through the fluid conduit to the spray gun.

BRIEF DESCRIPTION OF THE DRAWINGS

The invention may take physical form in certain parts and arrangements of parts preferred embodiments of which will be described in detail in this specification and illustrated in the accompanying drawings which form a part hereof and wherein.

DETAILED DESCRIPTION OF THE PREFERRED EMBODIMENTS

Figure 1:
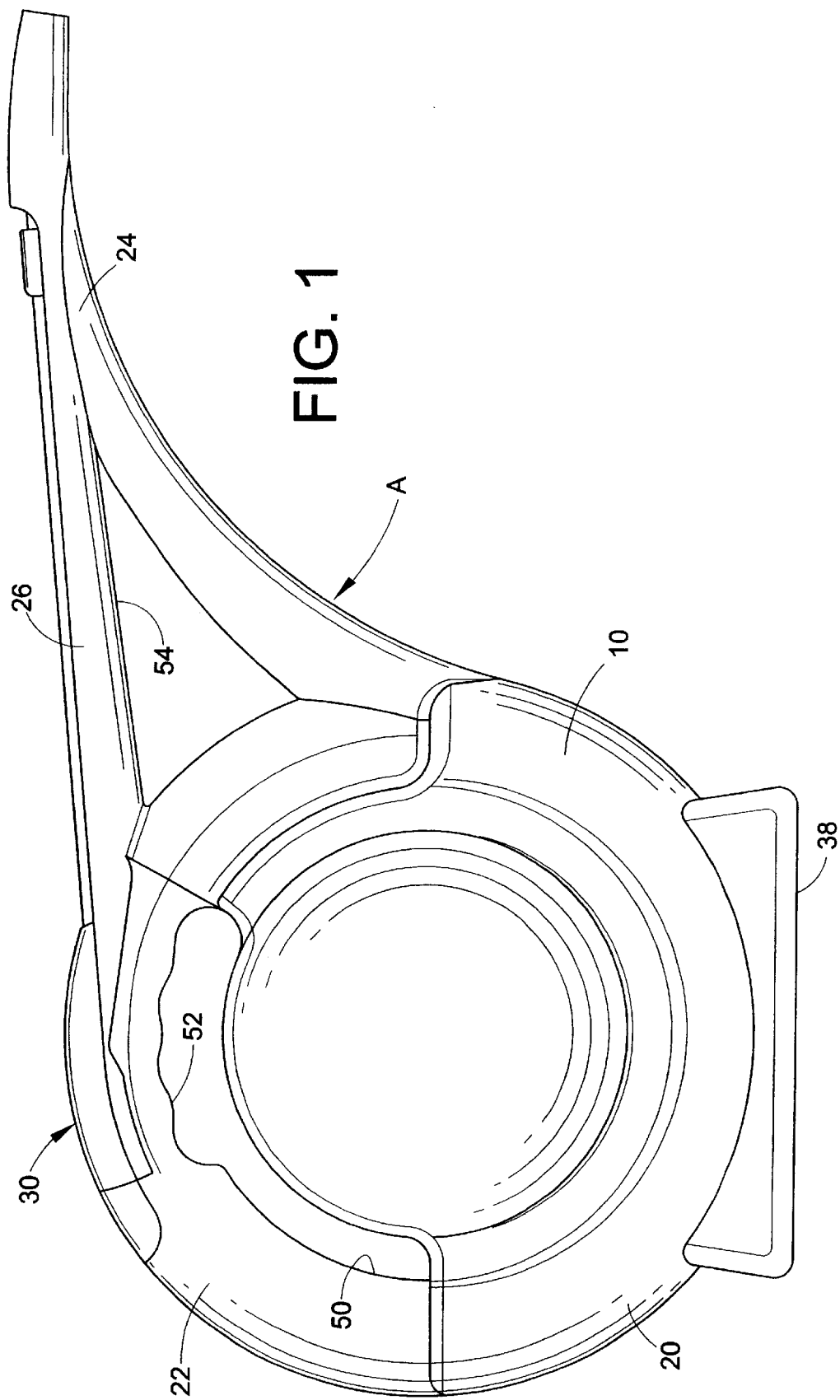
FIG. 1 is a side elevational view of a plant watering device according to a first embodiment of the present invention.

Referring now to the drawings, wherein the showings are for purposes of illustrating preferred embodiments of the invention only and not for purposes of limiting same, FIG. 1 shows the subject new plant watering device. While the device will be described hereafter as providing a liquid, namely water, for potted plants normally located in a building, it should be appreciated that a liquid delivery device is disclosed which can be used to provide any suitable liquid to a plant located either indoors or outdoors. Thus, a liquid fertilizer mixture could be delivered with the device disclosed herein.

Figure 2:
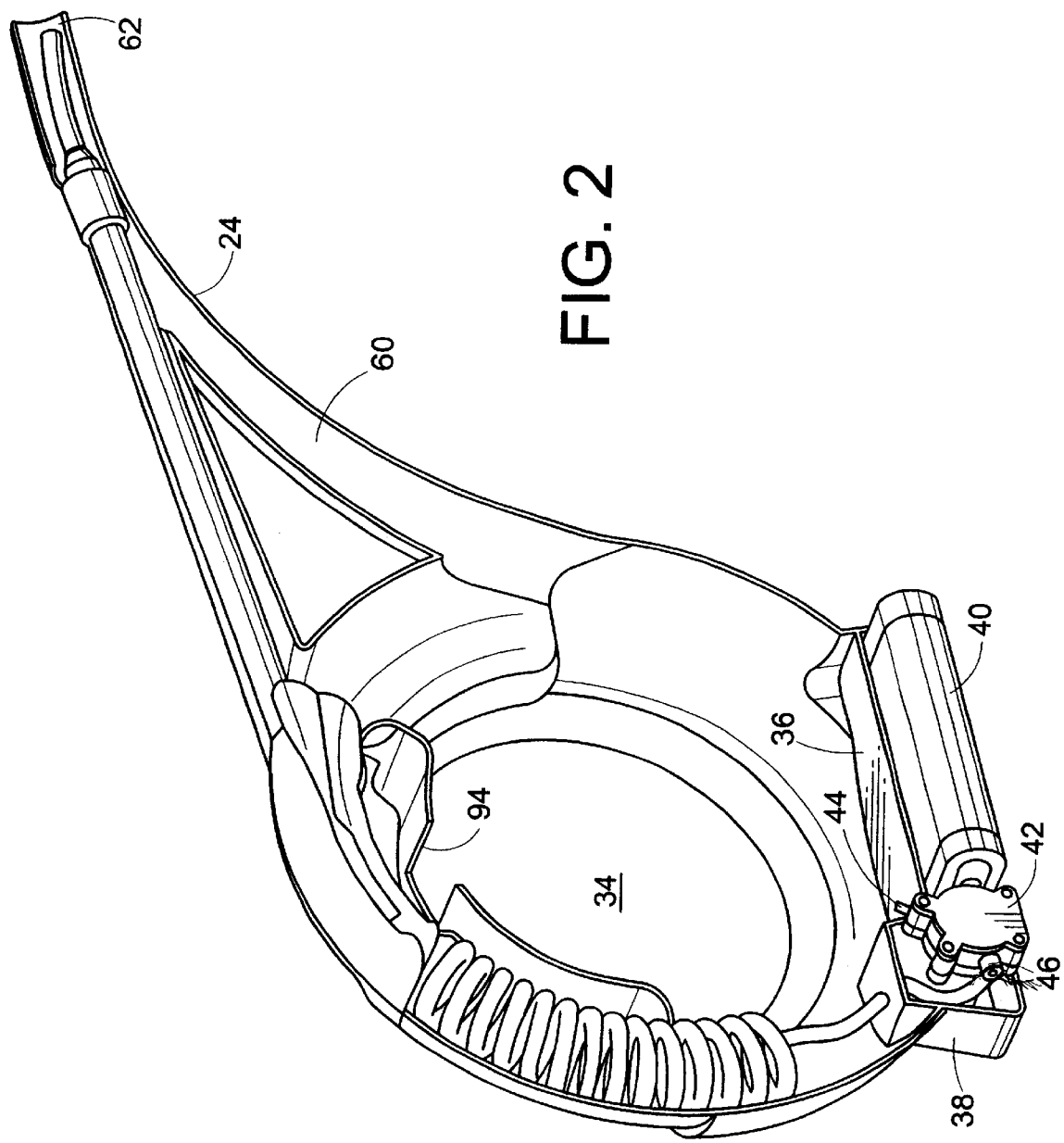
FIG. 2 is a perspective view of the plant watering device of FIG. 1 with one housing half removed in order to show interior details thereof.
Figure 3:
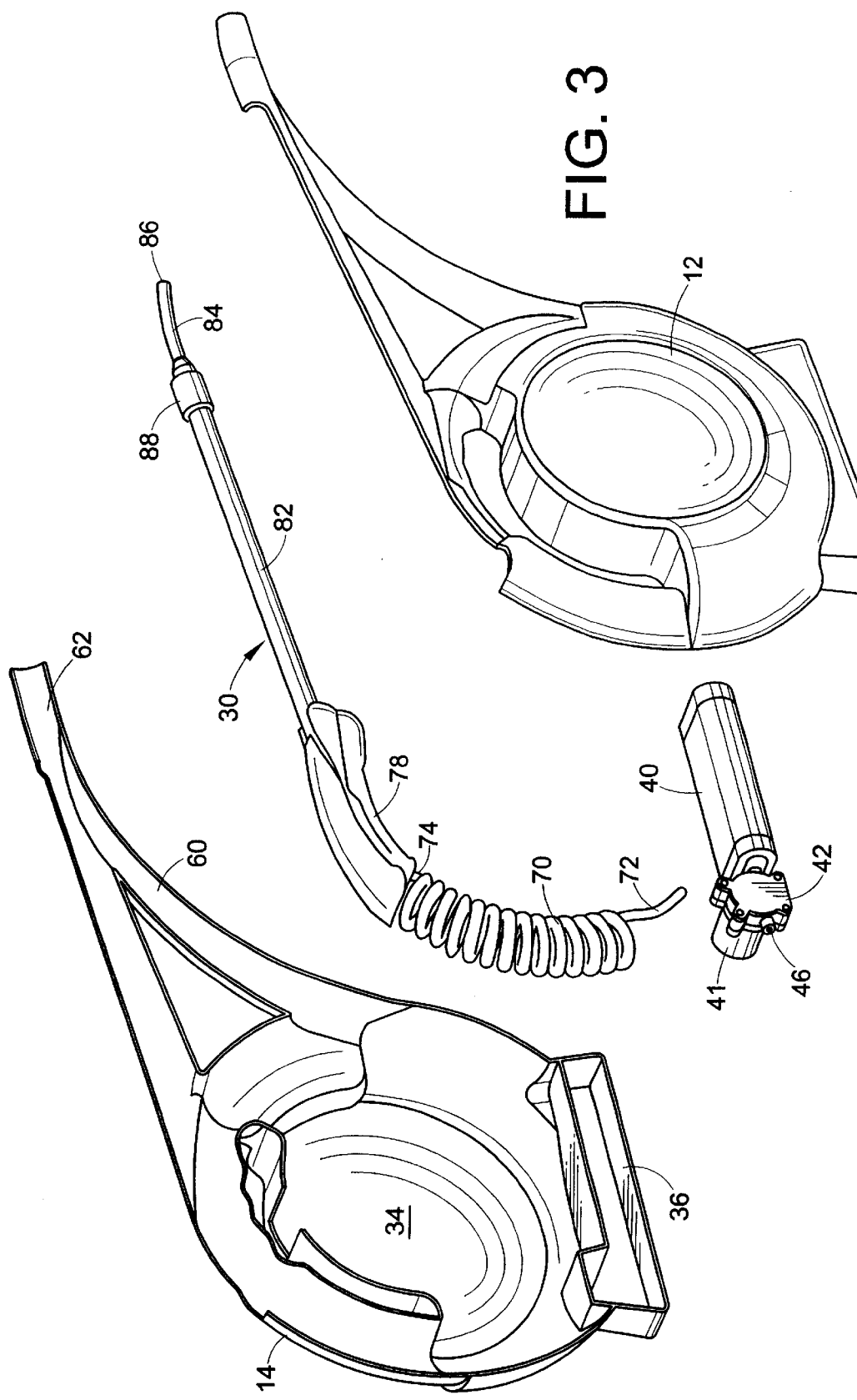
FIG. 3 is an exploded perspective view of the plant watering device of FIG. 1.

FIG. 1 discloses a watering can A comprising a housing 10 having a first half 12 and a second half 14 (FIG. 3). The housing has a fluid containing portion 20, a handle portion 22 and a dispensing portion 24. Also provided is a storage trough 26 for holding a spray gun 30. With reference now to FIG. 2, the fluid containing portion 20 is in the form of a reservoir 34 in which a suitable liquid, such as water, can be stored. Located below the reservoir is a compartment 36 which forms a base 38 for the watering can A. Held in the compartment are a battery 40 and, located adjacent thereto, an electrically powered motor 41 which operates a pump 42. The pump has an inlet 44 and an outlet 46 (FIG. 3).

It should be apparent that the battery 40 can be of a rechargeable type such as the well known Nicad batteries or can be of the replaceable type. For the latter purpose, the compartment 36 can have a suitable door (not illustrated) to allow for selective replacement of the battery. The pump is conventional and of a type well known to those having ordinary skill in the art. Consequently, a detailed explanation of the construction and operation of the pump is considered unnecessary. Suffice it to say, the motor 41 can be a suitable conventional direct current motor which is powered by the battery 40 and mechanically drives the pump 42, which can be a centrifugal pump. No priming is necessary for the pump since it is positioned below the reservoir 34. Also, no valving is necessary since liquid will not flow away from the pump, but only towards it, given the pump's location.

The inlet for the pump can be located at the lowest elevation of the reservoir, even when the watering can A is tilted forward. It may be useful, for this purpose, to locate a funnel on the base wall of the reservoir. The funnel can be located adjacent a forward end of the compartment 36 so as to accommodate an intake of water both when the watering can A is held level and when it is tilted forward.

With reference again to FIG. 1, the handle portion includes a first tubular section 50, a second contoured section 52 located adjacent thereto and a third section 54 which is located forwardly of the contoured section and constituted by a lower face of the storage trough 26. In this way, a person handling the watering can A can grip any one of the three handle sections 50–54, or perhaps two of them, as may be desired for any particular circumstance.

Figure 4:
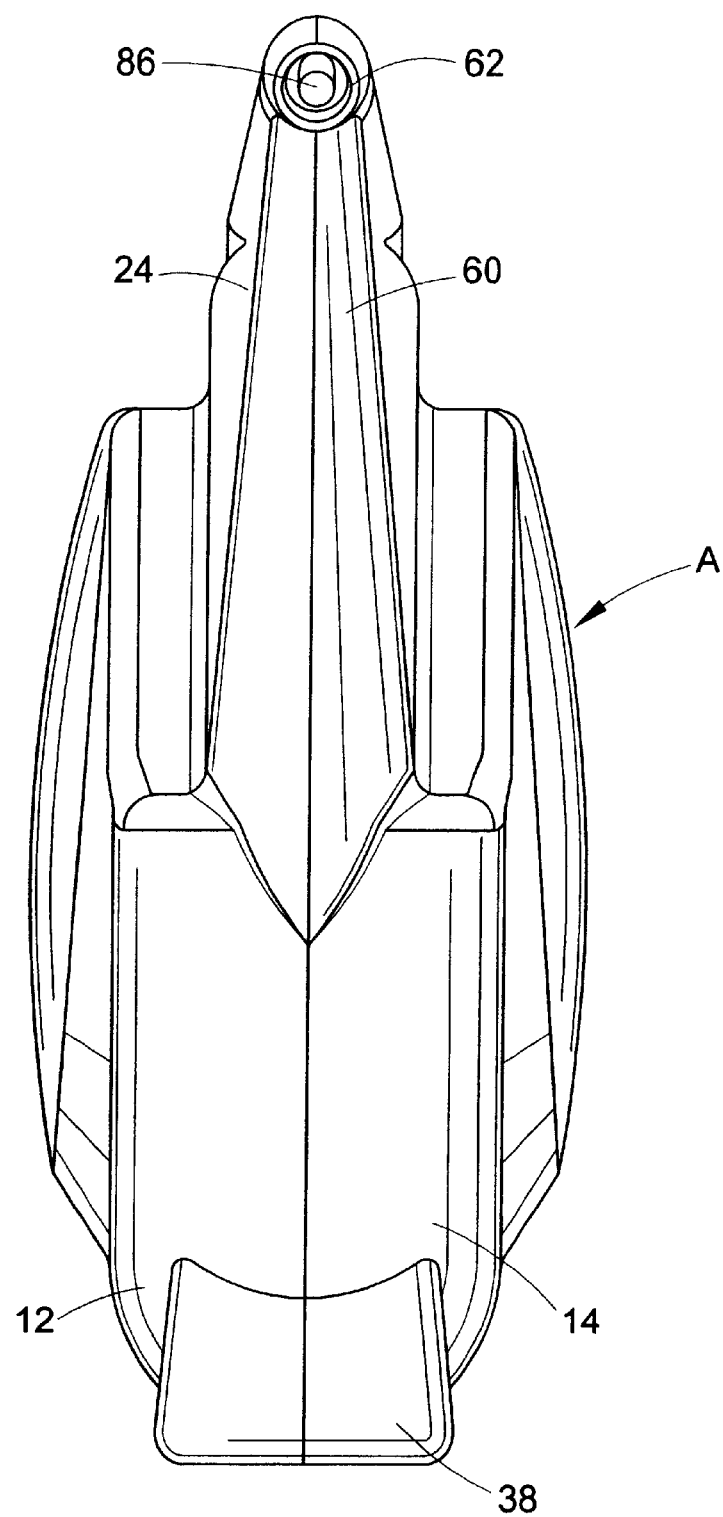
FIG. 4 is a front elevational view of the plant watering device of FIG. 1.

With reference now to FIG. 4, the dispensing portion 24 comprises a channel 60 leading from the reservoir 34 and communicating with a spout 62 located at the distal end of the channel 60.

Figure 9:
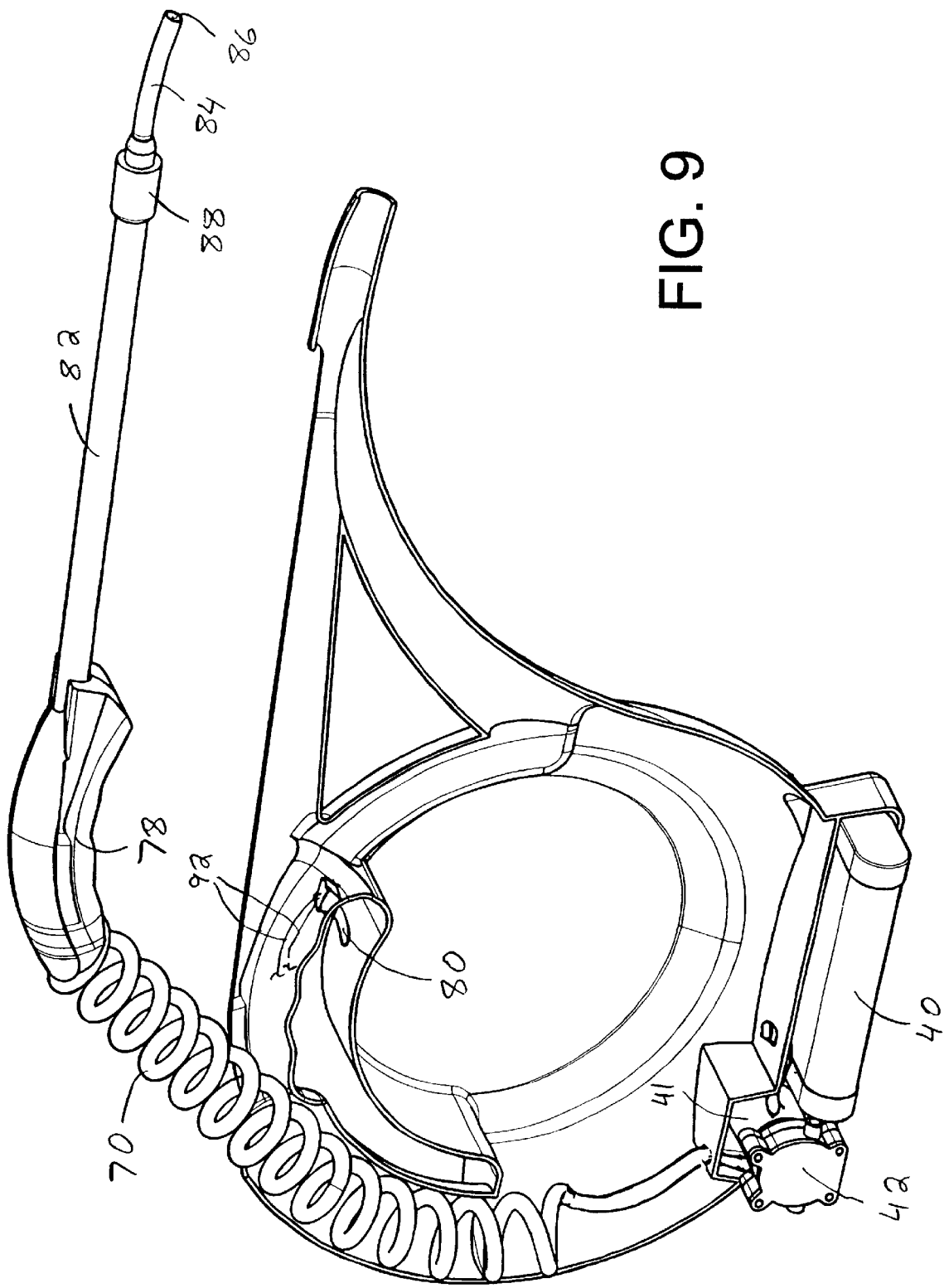
FIG. 9 is a perspective view, partially broken away, of the plant watering device of FIG. 1 with a sprayer thereof detached from a housing.

With reference now to FIG. 3, the sprayer device or spray gun 30 can comprise a flexible coiled tubing 70 having an inlet end 72 in fluid communication with the pump outlet 46 and an outlet end 74 in fluid communication with a suitable conduit (not visible) extending through a handle 78 of the spray gun 30. As best shown in FIG. 9, located on the contoured section 52 of the handle portion is a trigger 80 which controls the motor 41 so as to selectively allow a flow of fluid through the handle 78 and to a nozzle tube 82. Nested telescopically within the nozzle tube 82 is an extension tube 84 which has an outlet 86 at a distal end thereof. A securing ring 88 allows the extension tube 84 to be secured in any desired longitudinal relationship with the nozzle tube 82. As is conventional, the liquid can exit the spray gun 30 at the outlet 86 in any suitable quantity, from a mist to a stream, depending upon what type of nozzle is provided at the outlet end of the extension tube 84.

With reference now to FIG. 9, it is apparent that one or more wires 92 extend from a switch (not shown) in the trigger 80 down to the motor 41 to actuate same. The trigger 80 can, in one embodiment, control the speed of the pump and, hence, regulate the rate at which the liquid is pumped out through the outlet 86. To this end, the amount the trigger is depressed can correspond to the amperage of the electricity the switch feeds the motor and thus the speed of the motor and the rate at which liquid is pumped out at the outlet 86. As is well known, the outlet can be provided with a suitable adjustable nozzle so that the amount of liquid dispensed at the outlet is adjustable from a mist to a stream. It is apparent that a variable speed motor 41 would be utilized for this purpose. The amount of trigger displacement would then control the rate of flow.

It is beneficial to locate the wiring inside the handle portion of the housing so as to keep the wiring, or at least the upper portion thereof adjacent the switch, out of contact with the liquid being pumped. It is also feasible to separate all of the wiring from the reservoir having the liquid in it as in the embodiment of FIGS. 6–8 by running the wiring through an external storage area for the coiled tubing. In this way, no liquid contacts the wiring.

It is advantageous to secure the wiring 92 to the housing handle portion 22 rather than secure the wiring to the flexible coiled tubing 70. Normally, wiring, which is conventionally made out of a metal, is not as flexible as is the material of the coiled tubing which is normally made from suitable thermoplastic materials. Moreover, the coiled tubing is uncoiled and recoiled a number of times which would tend to wear any wiring that was secured to it or in it.

Figure 5:
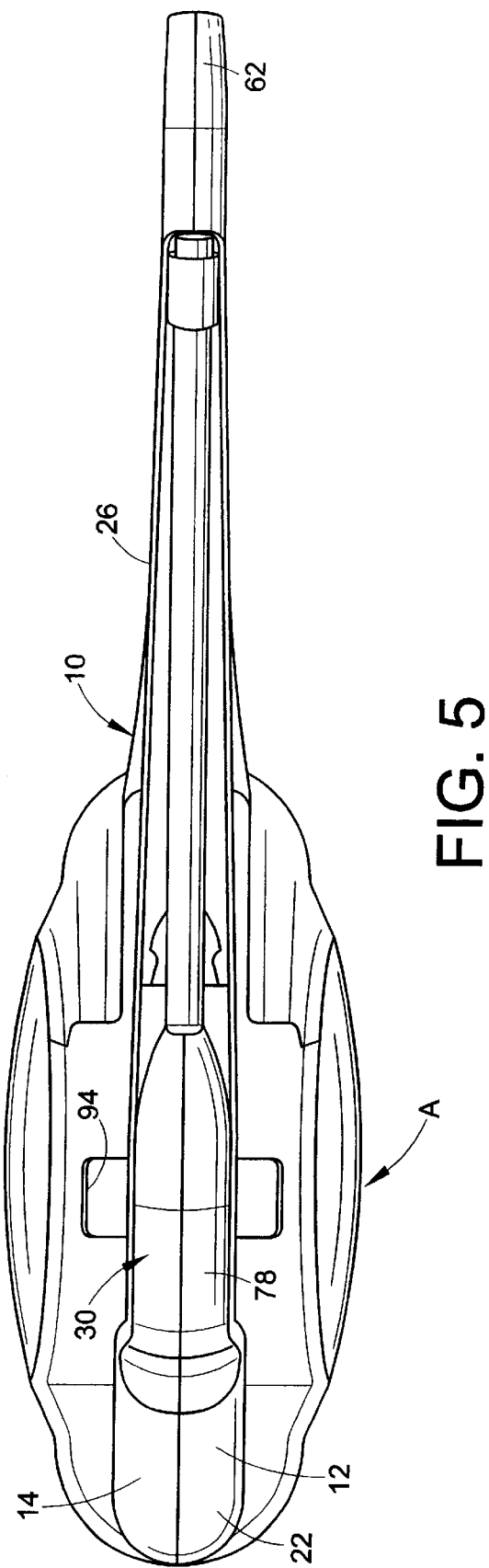
FIG. 5 is a top plan view of the plant watering device of FIG. 1.

It should be apparent from FIG. 4, that the outlet 86 of the extension tube 84 is nested within the spout 62 of the watering can A. With reference now to FIG. 5, the spray gun 30 can be readily removed from the housing 10 by simply lifting the handle 78 out of the trough 26. The handle 78 is then moved rearwardly to allow the extension tube outlet 86 to clear the spout 62. As shown in FIG. 9, the spray gun 30 can then be elevated from the housing 10 since the coiled tubing can be stretched.

The housing 10 can be fabricated from any suitable conventional material such as certain known thermoplastics or any other lightweight material. The reservoir 34 can have a capacity of anywhere from one half gallon to two or more gallons so that an adequate, but not burdensome, supply of liquid may be carried. To refill the reservoir, a refill opening 94 (FIG. 5) is formed atop at least one of the two housing halves. The spray gun 30 can also be made from suitable conventional materials such as selected plastics and metals.

If desired, a filter (not illustrated) can be positioned over the inlet 44 of the pump. Also, a fertilizer dispenser (not illustrated) can be positioned in the reservoir. In this way, the liquid being dispensed can be a mixture of fertilizer and water, if that is considered desirable.

Figure 6:
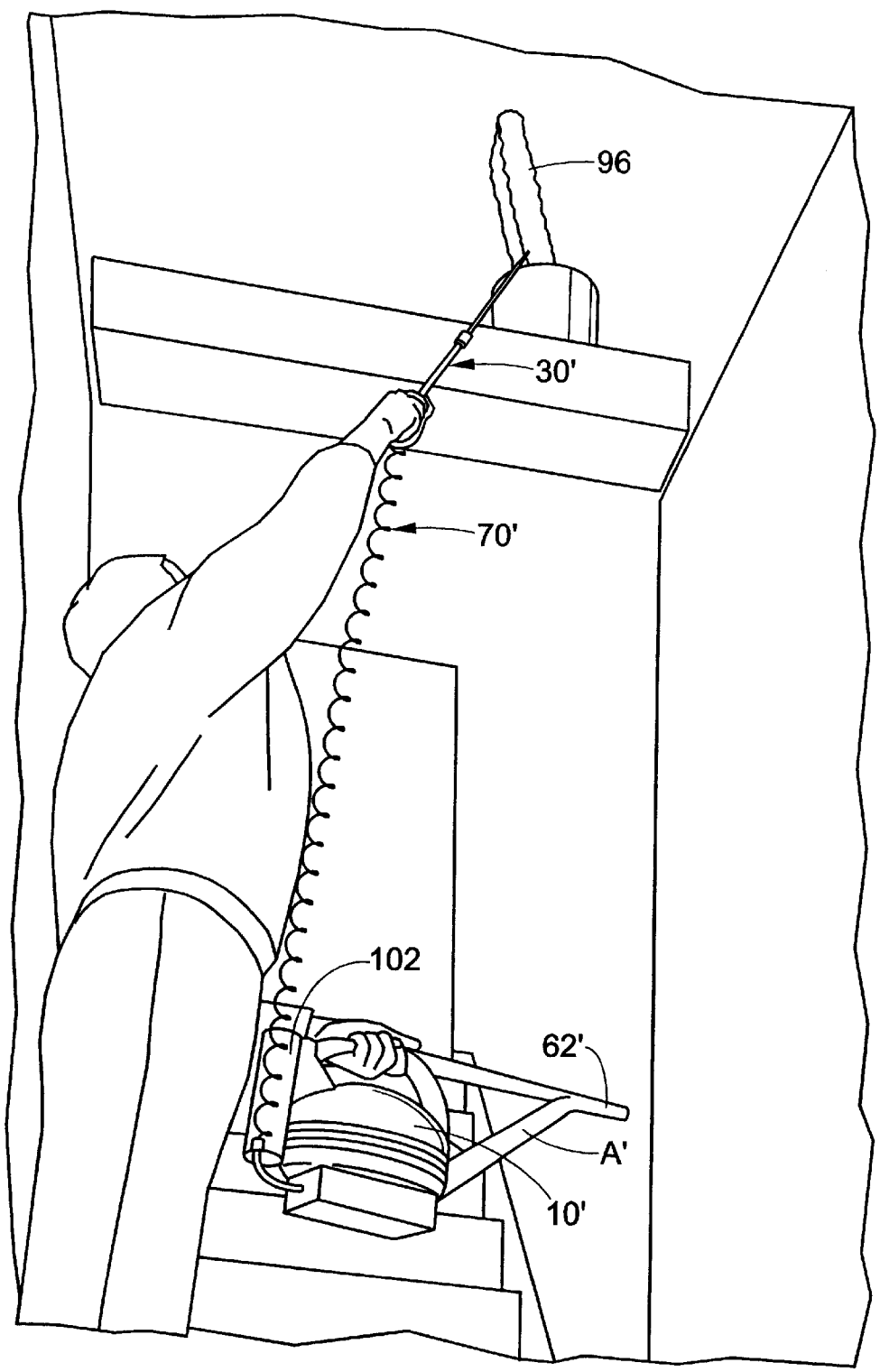
FIG. 6 is a perspective view of a plant watering device according to a second embodiment of the invention being employed to water and overhead plant via a spray gun.
Figure 7:
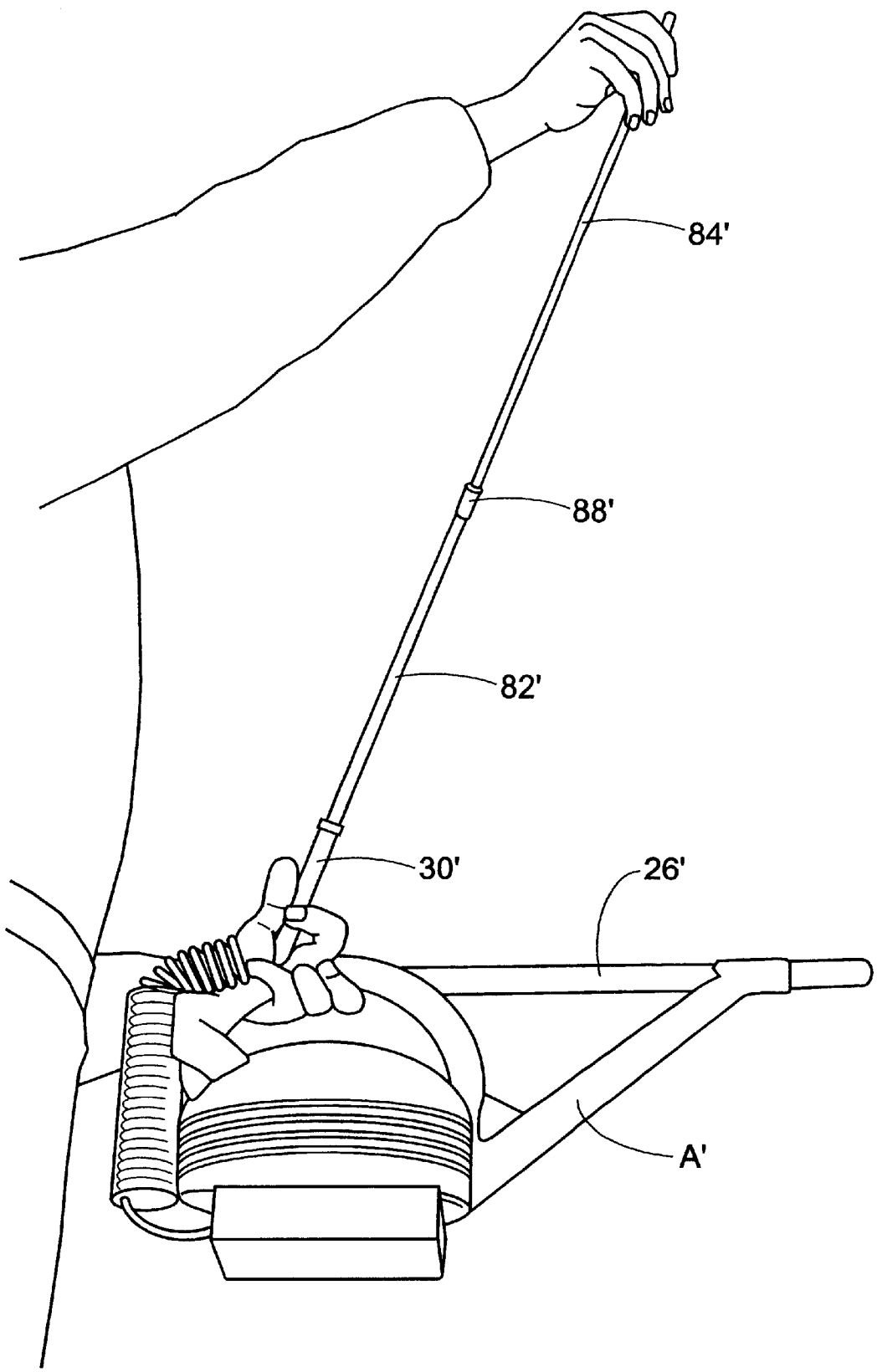
FIG. 7 is a perspective view of the plant watering device of FIG. 6 showing a pair of telescoping tubes of a spray gun.
Figure 8:
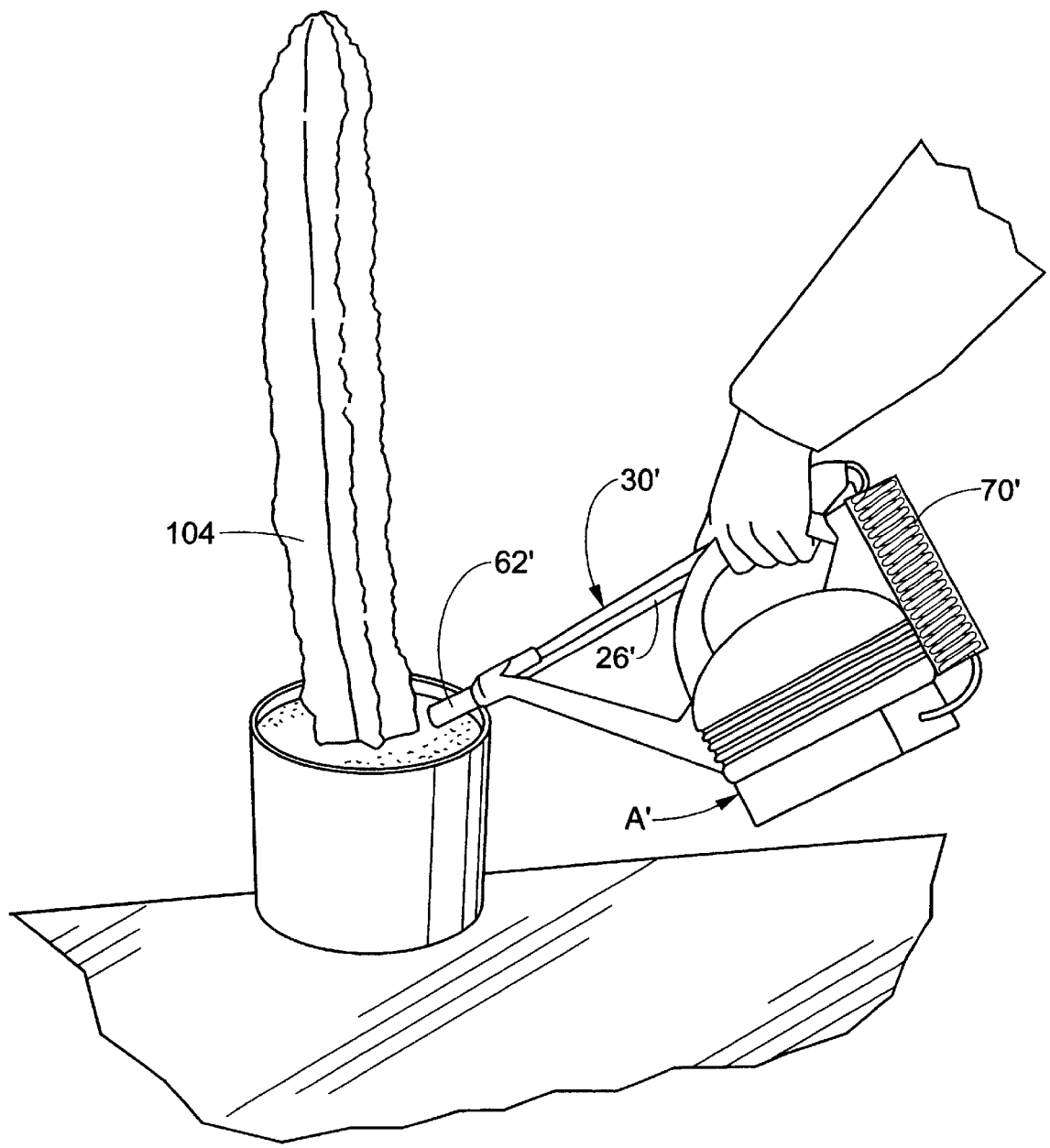
FIG. 8 is a perspective of the plant watering device of FIG. 6 being employed to watering a conventional potted plant via a spout.

With reference now to FIGS. 6–8, the operation of the watering device of the present invention will there be described. While FIGS. 6–8 illustrate another preferred embodiment of the present invention, the operation of the two embodiments is identical. For ease of appreciation and understanding, the like components of the embodiment of FIGS. 6–8 will be described with like numerals with a primed suffix (') and new components will be identified by new numerals. As illustrated in FIG. 6, a watering can A' includes a flexible coiled tubing 70' which can be uncoiled when the device is used for watering overhead plants 96. In this embodiment, the flexible coined tubing is held in a cylinder 102 which is located rearwardly of a housing 10'. During the operation for overhead watering illustrated in FIG. 6, only the spray gun 30' is employed and the spout 62' is not in use. One advantage of providing the trigger on the handle portion of the device is that the trigger can be actuated with one hand while the other hand holds the handle over a person's head for applying liquid to a plant located well above the person's head.

With reference now to FIG. 7, the spray gun 30' has a first nozzle tube 82' and an extension tube 84' which can be selectively moved in relation to each other and secured via a securing ring 88'. In this way, watering of overhead plants is more easily conducted. It should also be apparent from FIG. 7, that the spray gun 30' is removed from its trough 26' when the spray gun is used such as for e.g. overhead spraying.

With reference now to FIG. 8, when the watering can A' is employed for watering a plant 104 positioned on the floor, then the spout 62' is employed and the spray gun 30' is simply nested in the trough 26'. Water from the reservoir of the watering can flows through the spout and around the distal ends of the tubes which extend into the spout 62'. Alternatively, watering can be performed in a level position of the watering can A'. For this purpose, rather than employing the spout 62' to feed the liquid by gravity to the plant 104, the trigger would be depressed to activate the pump. When this is done, the pump is employed to feed liquid to the plant 104 through the spout 62'.

Figure 10:
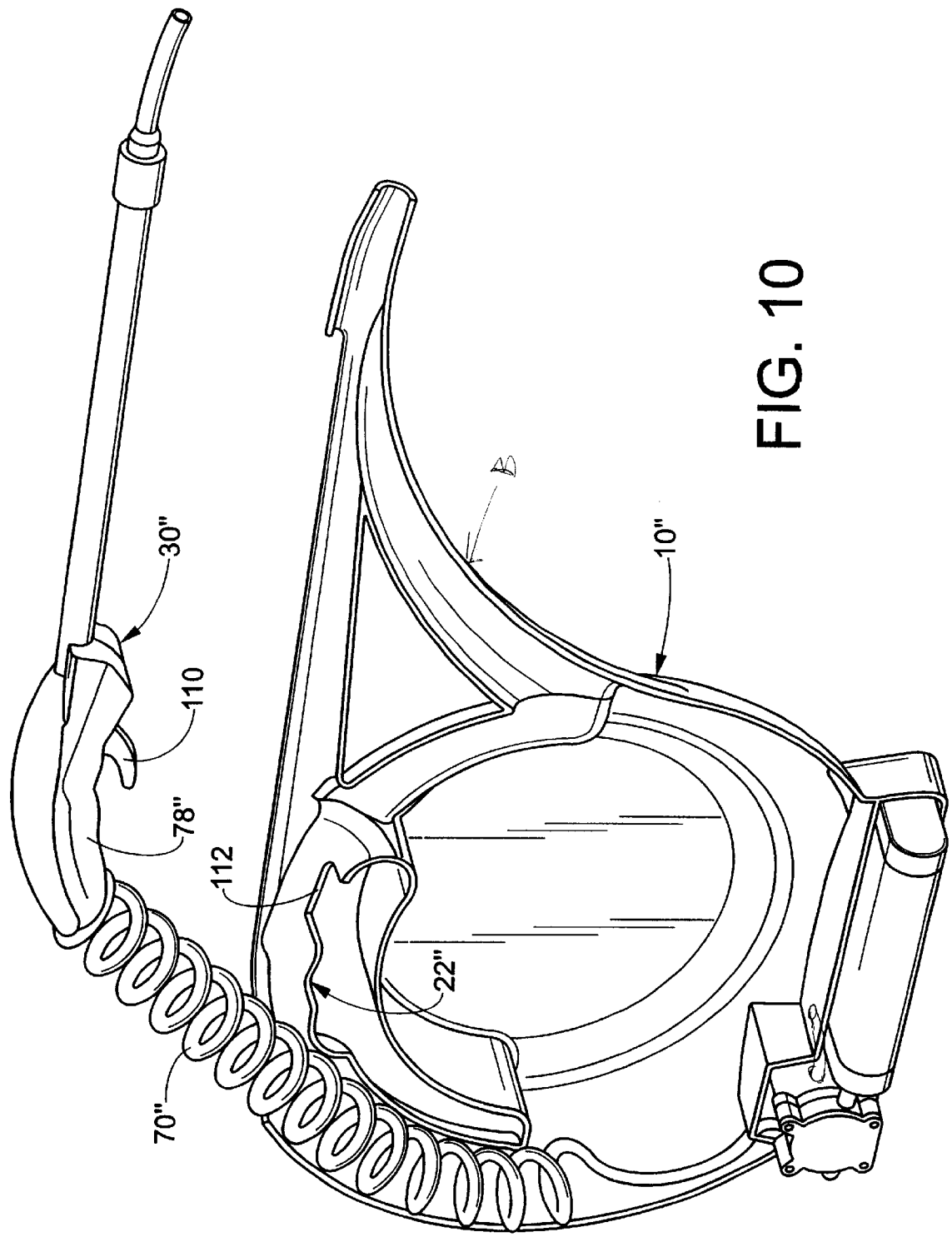
FIG. 10 is a perspective view, partially broken away, of the plant watering device according to another embodiment of the present invention.

With reference now to FIG. 10, another embodiment of the present invention is there illustrated as a plant watering and misting device B. For ease of comprehension and appreciation, like components are identified by like numerals with a double primed suffix (") and new components are identified by new numerals. In this embodiment, a trigger 110 is positioned on a handle section 78" of a spray gun 30". When the spray gun 30" is nested in a housing 10" of the watering can, the trigger 110 extends through a slot 112 in a handle portion 22" of the can. Obviously, in this environment, the wiring leading from the trigger 110 to the motor has to be secured on or in a coiled flexible tubing 70" connecting the spray gun to the can. This construction may be advantageous in certain environments. Such advantages may overcome the disadvantages of such a construction which were noted above.

Figure 11:
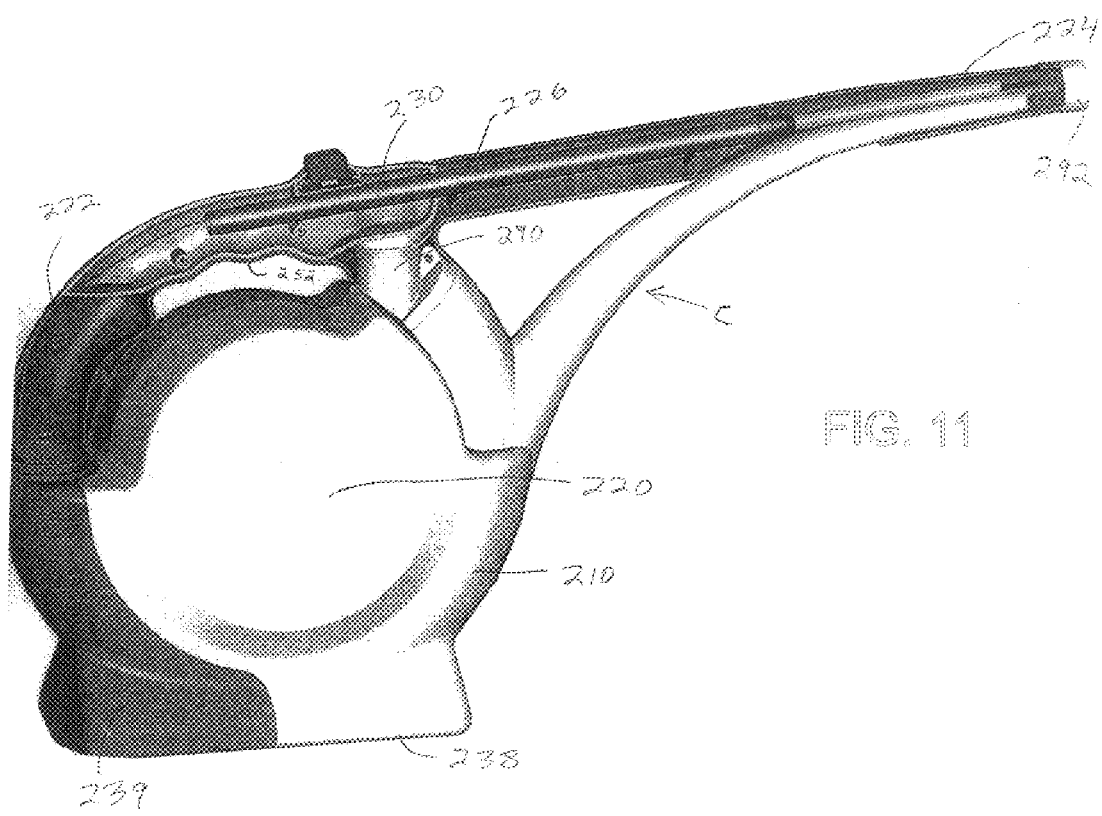
FIG. 11 is a side elevational view, partially broken away, of still another embodiment of the present invention.
Figure 12:
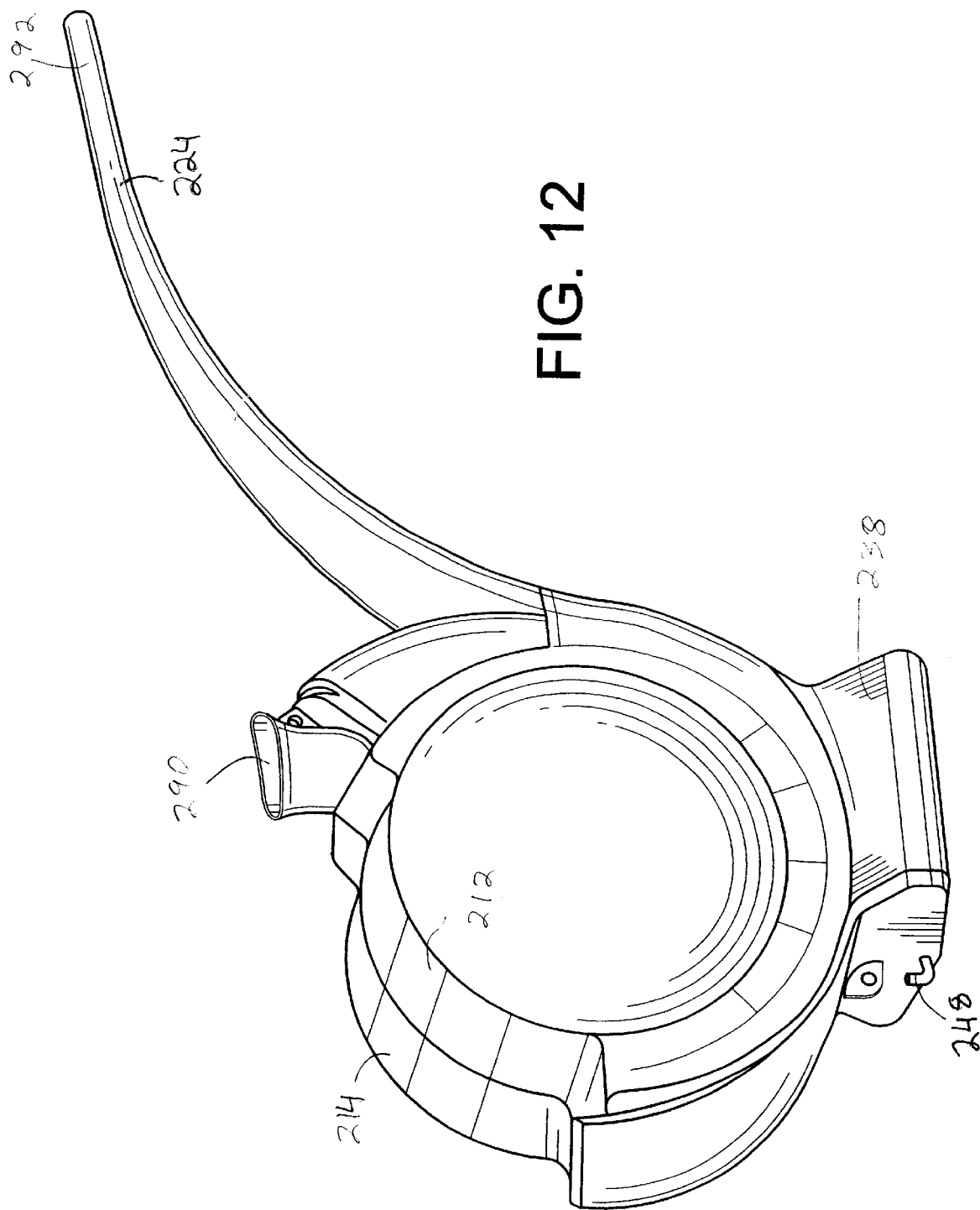
FIG. 12 is a perspective view of a portion of the device of FIG. 11.
Figure 13:
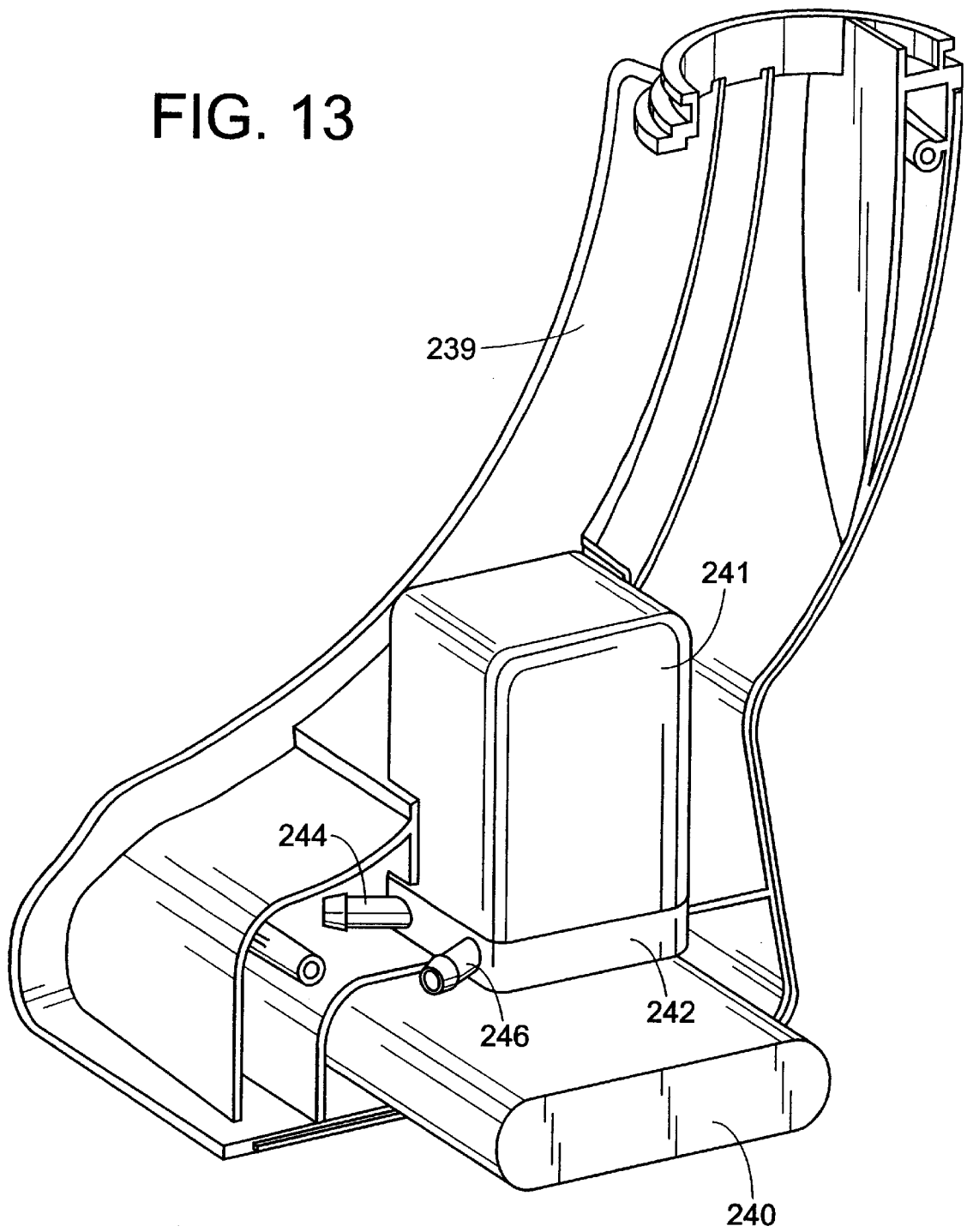
FIG. 13 is an enlarged reverse perspective view of a portion of a pump and battery compartment of the device of FIG. 11; and, FIG. 14 is a greatly enlarged reverse side elevational view of a portion of the device of FIG. 11.

With reference now to FIG. 11, still another embodiment of the present invention includes a plant watering and misting device C having a housing 210 comprising a first half 212 and a second half 214 (see FIG. 12). The housing halves can be blow molded from a conventional thermoplastic material. The housing thus forms a fluid containing portion or reservoir 220 and a handle portion 222 as well as a dispensing portion 224. A storage trough 226 accommodates a sprayer 230. The housing also forms a base 238. With reference now to FIG. 13, part of the base is a compartment, formed of two halves 239, which accommodates a rechargeable or replaceable battery 240 and a motor 241. The motor powers a pump 242 having an inlet 244 and an outlet 246. Removed from FIG. 11 for the sake of clarity is the flexible conduit connecting the pump to the sprayer 230. Also removed, in FIG. 13, is a short stretch of flexible tubing which connects an outlet tube 248 from the reservoir 220 (FIG. 12) to the inlet 244 of the pump 242. The two halves 239 of the compartment can be secured to the housing halves 212, 214 by suitable fasteners, not illustrated, so that access may be had to the motor, pump and battery as may be needed.

Figure 14:
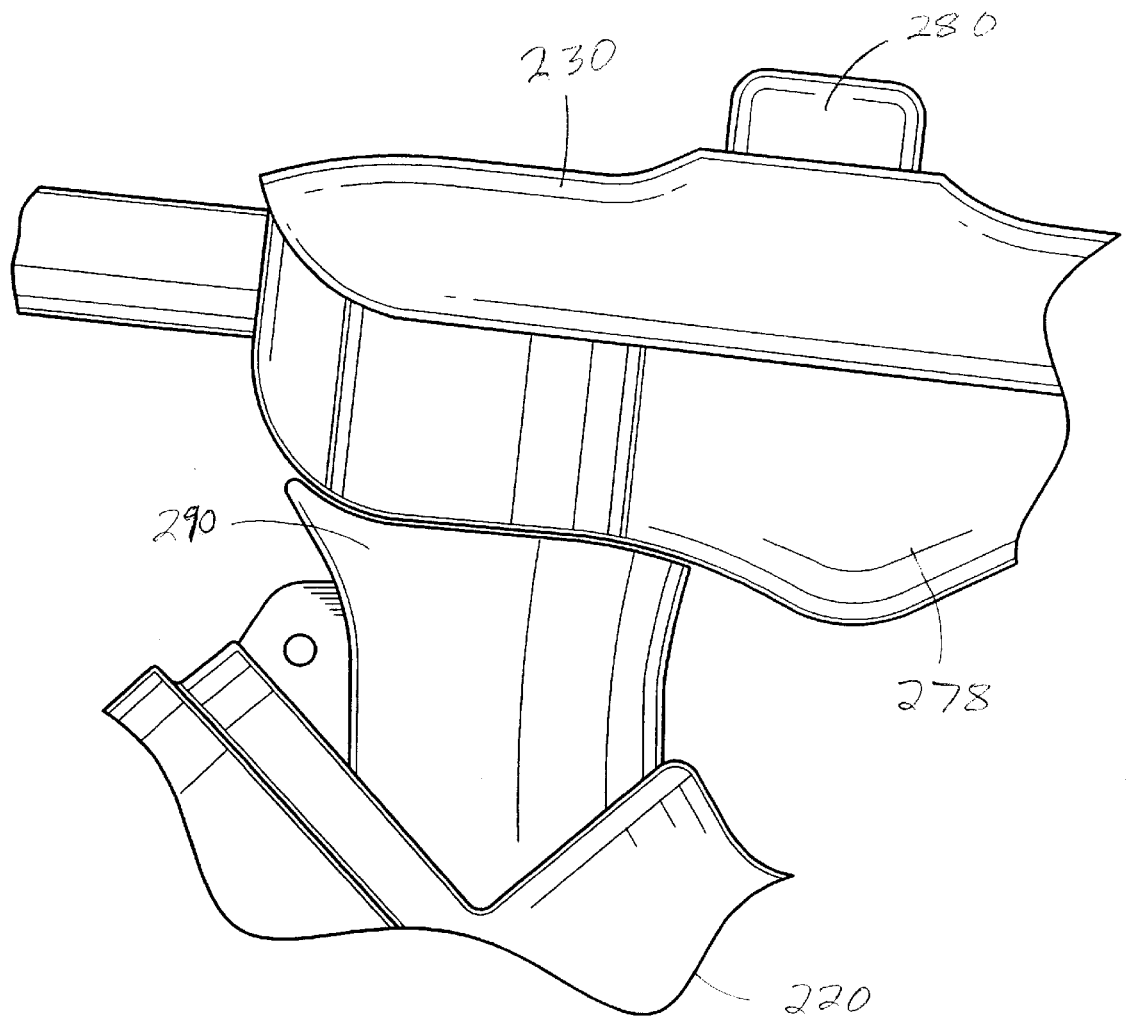

In this embodiment, and with reference now to FIG. 14, the sprayer 230 includes a handle 278 and a spray button 280. A portion of the handle 278 is accommodated on a refill inlet 290 of the reservoir 220 to prevent the water held in the reservoir 220 from spilling. A complete seal is, however, not desirable as air needs to enter the reservoir 220 when water flows out of it. Another portion of the handle 278 is accommodated on a contoured section 252 of the handle of the plant watering and misting device C. That portion of the handle 278 is similarly contoured. As is evident from FIG. 12, the refill inlet is spaced from a dispensing outlet or pouring spout 292 of the watering device.

The present invention thus pertains to a self-contained portable plant watering and spraying device that includes a housing with a reservoir for containing a liquid to be dispensed onto plants and a spray gun or sprayer that can be selectively removed from the housing and adapted to be held in a person's hand. The sprayer includes a handle portion, an actuating control and a nozzle tube portion extending from the handle portion. A flexible fluid conduit connects the reservoir with the sprayer. A pump in the housing conveys liquid from the reservoir through the flexible fluid conduit to the handle portion of the sprayer. A battery compartment on the housing powers a motor which actuates the pump. The plant watering device has an integral handle by which it can be picked up and moved. The handle can have several different sections to allow an easier grasping of the device, as may be desired for any particular application.

The invention has been described with reference to several preferred embodiments. Obviously, modifications and alterations will occur to others upon the reading and understanding of this specification. It is intended to include all such modifications and alterations insofar as they come within the scope of appended claims or the equivalents thereof.

Having thus described the preferred embodiments, the invention is claimed as follows:

1. A self-contained portable plant watering/misting device comprising:
   a housing including a liquid reservoir, a filling opening communicating with said reservoir and a pouring spout, spaced from said filling opening, communicating with said reservoir;
   a sprayer selectively supported by said housing;
   a pump supported by said housing and communicating with said reservoir; and,
   a flexible fluid conduit connected at a first end with said pump and at a second end with said sprayer.

2. The device of claim 1 further comprising a battery for powering said pump.

3. The device of claim 2 further comprising a compartment defined in said housing for accommodating said pump and said battery.

4. The device of claim 3 wherein said compartment is located adjacent a base wall of said housing.

5. The device of claim 1 wherein said sprayer comprises a handle and an actuator for selectively actuating said sprayer.

6. The device of claim 5 wherein said sprayer further comprises:
   a first tube section having a first end which is connected to said handle and a second end; and,
   a nozzle which communicates with said first tube section second end.

7. The device of claim 6 wherein said sprayer further comprises:
   a second tube section telescopically received in said first tube section.

8. The locking device of claim 7 wherein said sprayer further comprises a locking element for selectively fastening said second tube section at a desired location in relation to said first tube section.

9. The device of claim 1 wherein said housing further comprises a handle.

10. A self-contained portable liquid dispensing system comprising:
    a housing including:
        a liquid reservoir,
        a filling opening communicating with said reservoir,
        a dispensing opening communicating with said reservoir and spaced from said filling opening,
        a handle, and
        a recess formed in said handle;
    a sprayer selectively received in said handle recess;
    a pump supported by said housing and communicating with said reservoir; and,
    a flexible fluid conduit connected at a first end with said pump and at a second end with said sprayer, at least a portion of said flexible fluid conduit being selectively supported in said handle recess.

11. The system of claim 10 wherein said sprayer comprises a handle and an actuator for selectively actuating said sprayer.

12. The system of claim 11 wherein said sprayer further comprises:
    a first tube section having a first end which is connected to said sprayer handle and a second end; and,
    a nozzle which communicates with said first tube section second end.

13. The system of claim 12 wherein said sprayer further comprises:
    a second tube section telescopically received in said first tube section.

14. The system of claim 13 wherein said sprayer further comprises a locking element for selectively fastening said second tube section at a desired location in relation to said first tube section.

15. A portable liquid dispenser comprising:
    a housing including:
        a liquid reservoir,
        a filling opening communicating with said reservoir,
        a pouring spout communicating with said reservoir, and
        a compartment separated from said reservoir, said compartment being located adjacent a base wall of said housing;
    a mounting area defined on said housing;
    a sprayer selectively supported by said mounting area, said sprayer comprising an actuator operated switch;
    a pump mounted in said compartment and communicating with said reservoir;
    a flexible fluid conduit connected at a first end with said pump and at a second end with said sprayer; and,
    a power source located in said compartment and energizingly connected to said switch and said pump, whereby activating said actuator operated switch energizes said pump causing liquid to flow through said fluid conduit to said sprayer.

16. The dispenser of claim 15 wherein said sprayer further comprises a handle.

17. The dispenser of claim 16 wherein said sprayer further comprises:
    a first tube section having a first end which is connected to said handle and a second end; and,
    a nozzle which communicates with said first tube section second end.

18. The dispenser of claim 17 wherein said sprayer further comprises a second tube section telescopically received in said first tube section.

19. The device of claim 18 wherein said sprayer further comprises a locking element for selectively fastening said second tube section at a desired location in relation to said first tube section.

20. The device of claim 15 wherein said mounting area comprises a recess for selectively accommodating said sprayer.

21. The device of claim 20 wherein said recess is located adjacent an upper surface of said housing and said compartment is spaced from said recess.

22. The device of claim 16 wherein said sprayer handle covers said filling opening when said sprayer is supported by said mounting area.

23. A self-contained portable plant watering/misting device comprising:
    a housing having a base wall and at least one side wall defining a liquid reservoir and a filling opening communicating with said reservoir;
    a pump supported adjacent said base wall of said housing;
    a sprayer;
    a flexible fluid conduit connected at a first end with said pump and at a second end with said sprayer, wherein said flexible fluid conduit extends from adjacent said base wall along at least a portion of said side wall to a location adjacent an upper end of said housing.

24. The device of claim 23 wherein at least a portion of said conduit is coiled when in a storage condition.

25. The device of claim 23 further comprising a compartment connected to said housing, said compartment accommodating said pump.

26. The device of claim 23 further comprising a compartment defined in said housing, said compartment accommodating said pump.

* * * * *